United States Patent [19]

Brewer

[11] 4,402,791

[45] * Sep. 6, 1983

[54] APPARATUS FOR PYROLYZING SHREDDED TIRES

[76] Inventor: John C. Brewer, 2529 Village Cir., Salt Lake City, Utah 84108

[*] Notice: The portion of the term of this patent subsequent to Aug. 30, 2000, has been disclaimed.

[21] Appl. No.: 291,164

[22] Filed: Aug. 10, 1981

[51] Int. Cl.³ .................. C10B 1/06; C10B 27/00; C10B 45/00

[52] U.S. Cl. ..................... 202/97; 201/25; 202/137; 202/254; 202/266; 585/241

[58] Field of Search ............... 202/97, 98, 137, 223, 202/224, 254, 260, 266; 201/2.5, 25; 585/241

[56] References Cited

U.S. PATENT DOCUMENTS

| | | | |
|---|---|---|---|
| 53,641 | 4/1866 | Mattocks | 202/224 |
| 325,908 | 1/1888 | Wilson | 202/97 |
| 1,490,542 | 4/1924 | Shaw | 202/98 |
| 1,608,210 | 11/1926 | Heitmann | 202/98 |
| 2,289,917 | 7/1942 | Lambiotte | 201/34 |
| 3,850,755 | 11/1974 | Welty | 202/223 |

FOREIGN PATENT DOCUMENTS 587559  4/1925  France .................. 202/97

Primary Examiner—Bradley Garris
Attorney, Agent, or Firm—Ronald E. Barry

[57] ABSTRACT

An apparatus for pyrolyzing shredded tires including an oven having a discharge opening and a tote having a discharge snout corresponding to the opening, the tote being placed in the oven with the snout inserted into the opening, radiant heating tubes are provided in the oven in close proximity to the top and bottom of the tote to heat the shredded tires, the tote having an inclined top for directing gaseous vapors produced on heating the tires toward the snout, the gaseous vapors are drawn through a discharge duct assembly and condenser by a fan located at the exhaust from the condenser.

23 Claims, 3 Drawing Figures

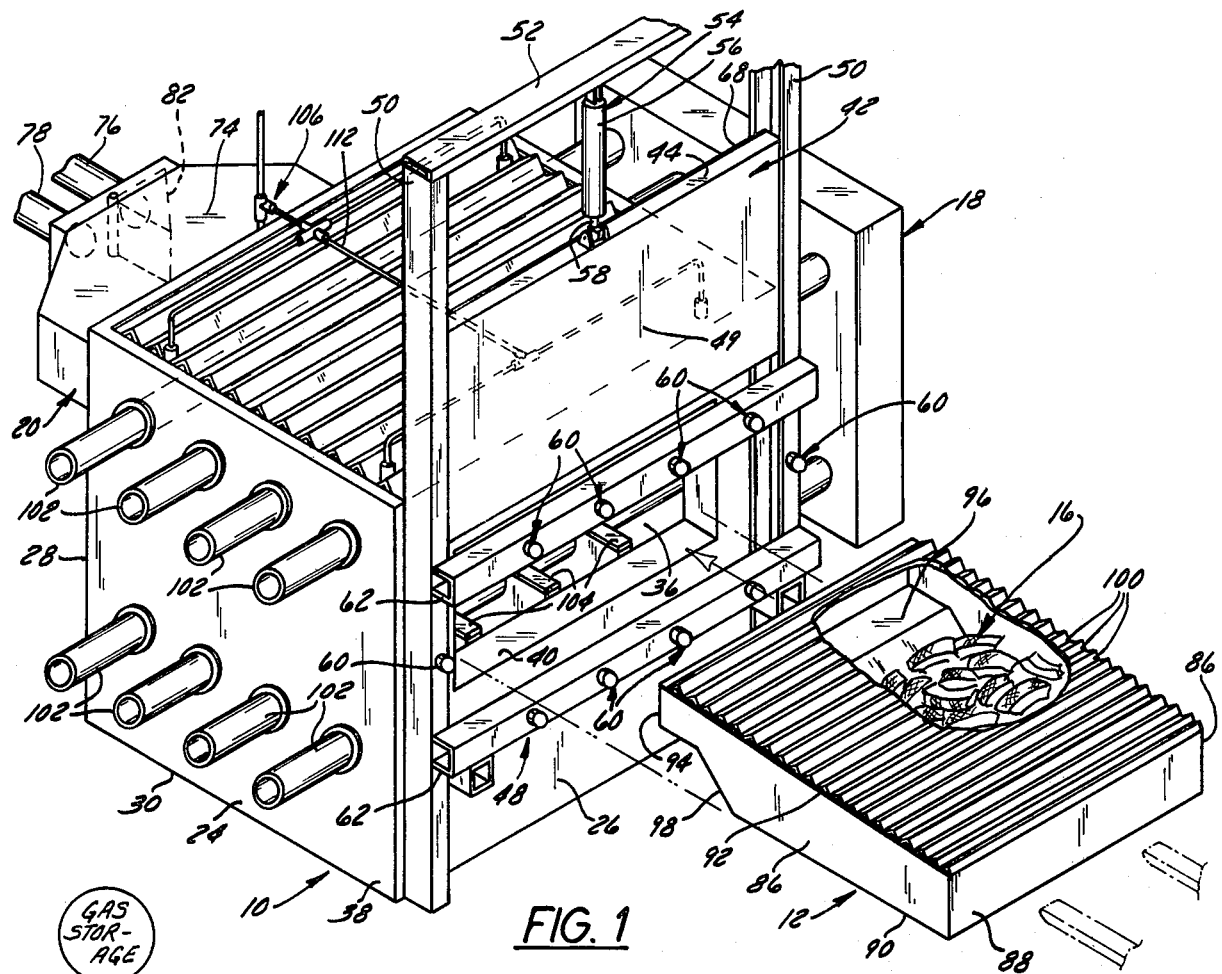
FIG. 1
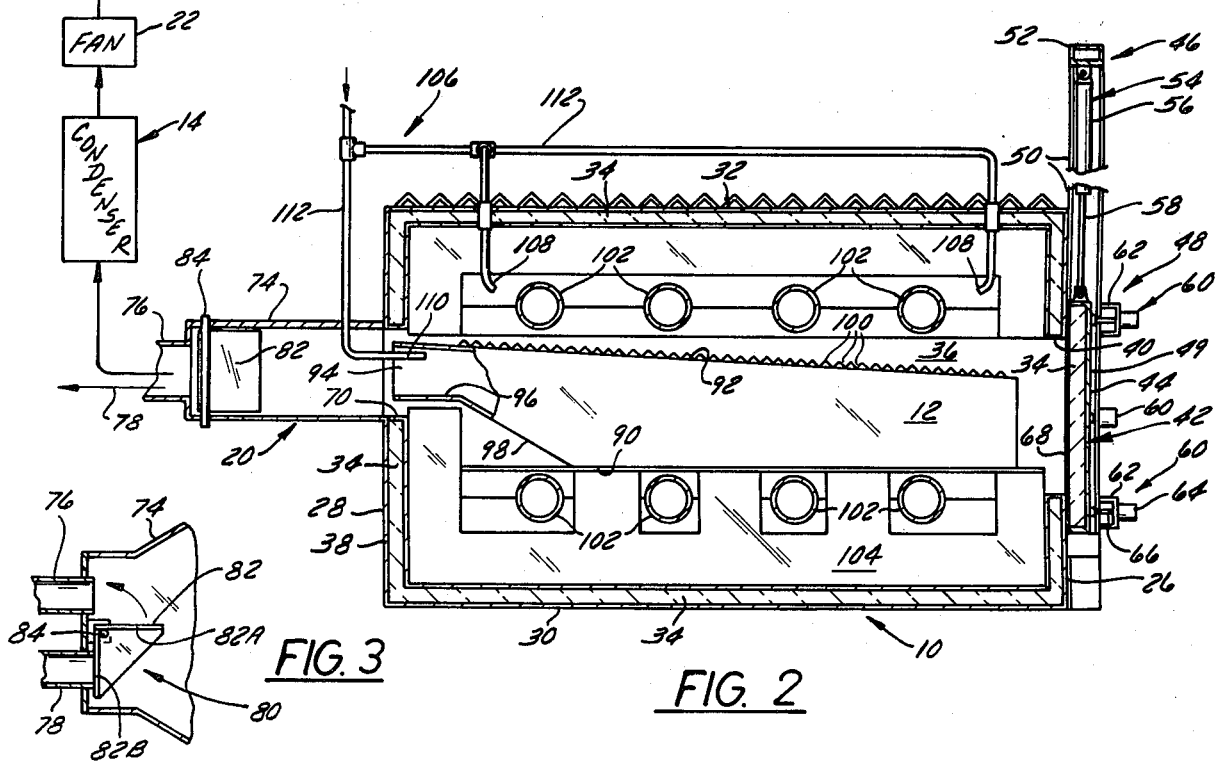
FIG. 3
FIG. 2

APPARATUS FOR PYROLYZING SHREDDED TIRES

BACKGROUND OF THE INVENTION

A pyrolysis apparatus for the conversion of tires to their basic components is disclosed in my application Ser. No. 191,171 filed on Sept. 26, 1980, now abandoned, and entitled "Apparatus for Pyrolyzing Shredded Tires". The apparatus disclosed is basically a batch type system wherein shredded pieces of tires are placed in open containers and heated to pyrolyze the tires, the gaseous discharge product being collected at the top of the oven.

SUMMARY OF THE INVENTION

The pyrolysis plant described herein provides improvements in efficiency of the system and products produced from the tires. The plant includes an oven formed of high temperature insulating block arranged to define a chamber and enclosed by a metal shell to hermetically seal the chamber. Radiant heating tubes are provided in the chamber to maintain the oven temperature at or above 1000° C. at all times. Shredded pieces of tires are placed in a unique tote which is placed in the oven chamber. The tote includes a top or roof which tapers upwardly to a discharge outlet or snout. The discharge snout corresponds to a discharge opening in the chamber and is inserted therein so that the gaseous vapors discharged from the tote will flow directly out of the chamber into a discharge duct assembly connected to the discharge opening in the chamber. A negative pressure is maintained in the discharge duct assembly to reduce the time required to transfer vapors produced in the tote to the condenser assembly.

IN THE DRAWING

FIG. 1 is a perspective view of the pyrolysis apparatus according to the invention.

FIG. 2 is a schematic view of the system for pyrolyzing tires showing a cross section of the pyrolyzing oven.

FIG. 3 is a section view of a portion of the discharge duct assembly showing the bypass system.

DESCRIPTION OF THE INVENTION

The apparatus for pyrolyzing tires according to the present invention generally includes a pyrolytic oven 10, a tote 12 and a condensing apparatus 14. The tote 12 is filled with shredded pieces of tires 16 and placed within the oven 10. The oven is heated by means of a gas burner assembly 18 mounted on the oven 10. The tires are heated in the tote and the gaseous vapor produced in the tote is vented through a discharge duct assembly 20 to the condensing apparatus 14. Means are connected to the condensing apparatus 14 in the form of a fan 22 for drawing the gaseous vapors from the tote by producing a negative pressure in the duct assembly 20.

THE PYROLYTIC OVEN

The pyrolytic oven 10 as seen in FIGS. 1 and 2 generally includes side walls 24, a front wall 26, a back wall 28, a bottom wall 30 and a top wall 32. The walls can be formed from insulating block 34 such as Ultra Lite 90 manufactured by the Interspace Corporation. The walls define a pyrolytic chamber 36 having an internal dimension of approximately 10 feet by 10 feet by 3 feet in height.

The chamber 36 is hermetically sealed by means of a steel jacket 38 provided around the outside surface of the insulating block 34. It is important in the operation of the oven 10 that air be prevented from entering the chamber 36 during the pyrolytic reaction of the tires. As pointed out above, a negative pressure is produced in the discharge duct assembly 20 to draw the gaseous vapor directly from the tote into the condensing apparatus 14. If air enters the chamber, it can be drawn into the duct assembly 20 reducing the efficiency of the system to draw the gaseous vapors into the condensing apparatus.

Access to the chamber 36 is provided through an opening 40 in the front wall 26. The opening 40 is closed by means of a door assembly 42 which includes a door 44, a lifting system 46, and a sealing system 48. In this regard, the door 44 is formed from a layer of insulating material 34 and enclosed by means of a steel jacket 49. The door 44 is raised and lowered with respect to the opening 40 by means of the lift assembly 46. This system 46 includes a pair of guides 50 connected at the top by means of a cross-member 52. A hydraulic or pneumatic piston and cylinder assembly 54 is used to slide the door up and down with respect to the guides 50. The piston and cylinder assembly 54 includes a cylinder 56 pivotally connected to the cross-member 52 and a piston 58 pivotally connected to the top of the door 44.

The door is sealed to the wall 26 by means of the sealing system 48. This system includes a number of hydraulic or pneumatic piston and cylinder assemblies 60 mounted on channel members 62 secured to the guides 50. Each assembly 60 includes a cylinder 64 and a piston 66 located in a position to engage the outside surface of the jacket 49 on the door. When the door 44 is lowered to a position in front of the opening 40, the cylinders 64 are pressurized to move the piston 66 against the door forcing the door into tight flush engagement with the outer surface of the wall 26. It should be noted that inside flange of the guides 50 are partially removed to allow space for engagement of the door 44 with the wall 26.

Means can be provided on the door 44 to improve the hermetic seal around the opening 40. Such means may be in the form of a seal member 68 provided around the edge of the door 44. The seal member 68 can be formed from any conventional high temperature compressible material.

Gaseous vapors are vented from the oven 10 through a discharge opening 70 in the back wall 28 into the discharge duct assembly 20 which is connected to the condensing apparatus 14. The discharge duct assembly is welded to the back wall 28 to maintain the hermetic seal between the oven and the condensing apparatus. In this regard the discharge duct assembly 20 includes a plenum 74 connected to the opening 70. Gases collected in the plenum are conducted to the condensing apparatus 14 by means of a pipe or tube 76 or to the atmosphere through a pipe or tube 78.

The flow of gaseous vapors through the discharge duct assembly 20 is controlled by means of a by-pass valve assembly 80 which includes a flapper valve 82 mounted for pivotal movement on a pivot post 84. The valve 82 includes a pair of valve plates 82A and 82B which are movable into engagement with the ends of pipes 76 and 78, respectively. Any convenient means can be used to rotate the valve 82 to close either the pipe 76 or the pipe 78. Means can be provided either on the end of the ducts 76 and 78 or the surfaces of the plates 82A and 82B to form a seal on closing the ducts.

TOTE

The tote 12 generally includes side walls 86 and an end wall 88, a bottom wall 90 and a top wall 92. The tote 12 has basic dimensions of 8 feet by 8 feet by 2 feet. The volume of the tote being approximately two-thirds the volume of the oven chamber 36. Gases produced in the tote are discharged to the discharge duct assembly through a snout 94 formed at one end of the tote by the top wall 92, side walls 86 and a plate 96. The snout 94 has a rectangular configuration corresponding to discharge opening 70. The bottom plate 96 is connected to the bottom wall 90 by an upwardly sloped panel 98. The top wall 92 slopes upwardly to define a flow path for gaseous vapors formed in the tote as described hereinafter. One or more reinforcing ribs 100 can be provided on the top of the tote to strengthen the top wall 92.

The tote 12 can be filled by standing the tote vertically on the end wall 88 and depositing shredded tires into the tote through the snout 94. Alternatively, the tote 12 may be provided with a top wall that can be opened or removed from the top of the tote so that shredded tires can be dropped directly onto the surface of the bottom wall 90. The top wall is then replaced on the top of the tote after the tote has been filled with the shredded tires.

THE RADIANT HEATING SYSTEM

The oven 10 is heated by means of a radiant heating assembly 18 which includes means for producing radiant heat within the oven 10 around the tote 12. Such means may be in the form of radiant heating tubes 102 positioned in a parallel spaced relation on the top and bottom of the oven 10. The radiant heating tubes can be formed of high temperature ceramic or stainless steel, either of which must have a capability of withstanding internal temperatures up to 2000° Centigrade. The tubes are heated by means of propane gas burners which produce a flame directly in the heating tubes 102 which quickly heat up to radiate heat to the tote 12.

As seen in FIG. 1, the tote 12 is supported on piers 104 located within the chamber 36. The piers are located in a parallel spaced relation (three being shown in the drawings) to support the tote in a spaced relation to the heating tubes 102. The tote can be inserted into the oven by any convenient means such as a fork lift truck having two or four tynes for supporting the tote as it is placed in the chamber 36. The discharge opening or snout 94 should project into the discharge opening 70. The gaseous vapors produced during the pyrolytic reaction of the shredded tires to the radiant heat is discharged directly into the discharge duct assembly 20. A negative pressure is maintained in the discharge duct assembly 20 in order to draw the gaseous vapors directly into the condensing apparatus 14. Since the oven 10 is sealed, the possibility of air entering the pyrolytic chamber 36 is virtually eliminated. This is believed to be a significant improvement since complete pyrolysis of the tires is achieved without any additional oxygen being admitted into the chamber 36.

Upon completion of the pyrolytic action, the chamber 36 and tote 12 are purged of any gaseous materials by means of a purging system 106 which is used to spray an inert gas such as nitrogen into the chamber 36 and tote 12. As seen in the drawing, the purging system 106 includes purging nozzles 108 located in each of the four corners of the chamber 36. The nozzles are arranged to discharge the inert gas toward the center of the chamber above the tote 12. The tote 12 is purged by means of nozzles 110 located at the entrance to the snout 94. The inert gas is fed to the nozzles through pipes 112 from a source of inert gas under pressure (not shown). Once it has been determined that the chamber has been completely purged of gaseous materials, the door 44 is released from the sealing system and raised by the piston and cylinder assembly 54. The tote 12 can then be removed and immediately replaced by a full tote.

PYROLYSIS PROCESS

The pyrolytic tire apparatus described above is one of the two essential pieces of equipment required to convert discarded tires into oil, carbon, steel and various gases, such as propane, methane and butane. In order to attain a practical process for making the conversion, tires must be initially shredded to a size that can be completely pyrolyzed in a minimum amount of time. A shredder of the type described in any one of my earlier U.S. Pat. Ser. Nos. 3,578,252; 3,635,409; 3,762,655; 3,840,187; 3,893,635; or 3,951,346 can be used to shred tires to a size approximately three by three inches. This is considered a maximum size for this process. The first step in the process, therefore, is to shred the tires.

Although it is not essential, it is recommended that all contaminants in the form of dirt and stones be removed from the shredded tires prior to pyrolyzing the tires. This can be accomplished by passing the shredded tires through a trommel or porous rotating drum. The dirt and stones will be knocked loose from the shredded tires and separated from the tires through the porous openings. The shredded pieces of the tires then can be placed in the totes.

The third step is to fill the tote with the shredded pieces of tires. This can be by direct discharge from the shredder or from the drum or from a stock pile of shredded tires. The tote can be filled through the snout or if an open top tote is used directly into the tote. Approximately 2,800 pounds of tires (125 standard tires) are placed in the tote.

Normally the oven is maintained at operating temperature at all times. This increases the life of the oven as well as the efficiency of the system since no time is lost in waiting for the oven to heat up. The oven is generally maintained at a temperature in excess of 1000° C. in order to reduce temperature fluctuations in the tubes and insulation.

The tote is placed in the oven with the snout extending into the discharge opening leading to the discharge duct assembly. A number of pieces of equipment can be used to load the tote into the oven such as a front end loader or an automatic sequence loader. With regard to the sequence loader, a four-step type is contemplated. The sequence includes dumping or unloading a tote, cleaning the tote of any residue, refilling the tote and loading the tote into the oven.

Once the tote has been placed in the chamber of the pyrolytic oven, the door is closed and locked to seal the chamber. The fan in the discharge line automatically starts once the door is closed. The door is opened only long enough to remove a tote from the oven and place a filled tote in the oven. The chamber and tote are purged to clear any air or oxygen from the system. The fan will create a negative pressure in the discharge duct assembly to draw any oxygen purged from the chamber into the discharge duct assembly.

The temperature in the chamber will drop slightly when the door is opened but will rapidly rise to the operating temperature once the door is closed. The radiant heat from the heating tubes will rapidly raise the temperature of the tote to start the pyrolyzing reaction in the shredded tires. The rubber in the tires will start to pyrolyze at approximately 125° C. (260° F.). The temperature in the tote will continue to rise to a maximum temperature of 1000° C. The tote temperature is maintained at 1000° C. until the tires have been completely pyrolyzed. Approximately one hour to one and one-half hours are required to pyrolyze the tires. Completion of the pyrolytic reaction is noted by sensing the cessation of gases from the tote.

It is believed that the efficiency of the reaction can be improved by adding oil to the tote prior to placing the tote in the oven. This oil will collect on the bottom of the tote below the pieces of shredded tires. As the temperature of this oil starts to rise, the oil will nucleate at the bottom of the tote creating high pressure bubbles in the oil which will burst on reaching the surface of the oil. The high temperature gases filter through the shredded tires. Since the gas in the bubbles is at a high temperature, the gas will circulate through the rubber heating up the shredded pieces.

The chamber and tote are again purged with nitrogen to clear any remaining gaseous vapors from the discharge duct. The door is then opened to remove the tote from the oven. The tote is dumped to remove the carbon and steel residue and a filled tote placed in the oven to start a new cycle of operation.

The completion time cycle for processing a tote of tires is approximately one hour and fifteen minutes. In a twenty-four hour period approximately nineteen cycles can be completed in a single oven. Approximately 200 gallons of oil, 788 pounds of carbon and approximately 56 pounds of steel can be recovered from each tote of shredded tires.

I claim:

1. An apparatus for pyrolyzing shredded pieces of tires comprising a closed chamber having a door at one end and a gas discharge outlet at the other end,
   a number of radiant heating members at the top and bottom of said chamber,
   a container for holding the shredded pieces of tires,
   said container including a discharge snout corresponding to the discharge outlet in said chamber,
   said container being adapted to be placed in said chamber between the heating members with the discharge snout of the container aligned within the discharge outlet at the other end of the chamber and means for heating said radiant heating members to a temperature sufficient to pyrolyze the shredded pieces of tires located in said container.

2. The apparatus according to claim 1 including means for sealing said chamber.

3. The apparatus according to claim 1 or 2 including means for purging said chamber with an inert gas.

4. The apparatus according to claim 1 including means connected to said discharge outlet of the chamber for collecting gases produced on pyrolyzing said tires.

5. The apparatus according to claim 4 wherein said gas collecting means includes means for producing a negative pressure in the discharge outlet for drawing the gaseous vapors produced from the pyrolyzed tires into said collecting means.

6. An apparatus for converting shredded pieces of tires into liquid and gaseous fuels,
   said apparatus comprising a hermetically sealed chamber having a gas discharge opening in one wall thereof,
   a plurality of radiant heating tubes in said chamber,
   burner means for heating said tubes, a container for holding shredded pieces of tires, said container being adapted to be positioned in said chamber,
   said container including a gas discharge portion which is adapted to be positioned in said gas discharge opening,
   a gas discharge duct assembly connected to said gas discharge opening,
   a condenser assembly connected to said discharge duct assembly for converting gases produced by the pyrolytic reaction of said tires into oil.

7. The apparatus according to claim 6 including means connected to said condenser assembly for producing a vacuum in said discharge duct assembly whereby volatiles produced by the pyrolytic reaction of the tires will be drawn through said condenser assembly.

8. The apparatus according to claims 6 or 7 wherein said radiant heating tubes are arranged both above and below said container.

9. The apparatus according to claim 8 including means for purging said chamber with an inert gas.

10. A pyrolytic oven comprising a front wall, a back wall, a pair of side walls, a top wall and a bottom wall, said walls being formed of high temperature insulating material arranged to form a chamber, a gas discharge outlet in the back wall of the chamber and an inlet in the front wall of said chamber, radiant heating means in the chamber having a capability of heating the chamber to a temperature above 1000° C., a container for holding shredded pieces of tires,
    said container having a discharge snout and being adapted to be placed in the chamber with the snout of the container positioned within the gas discharge outlet in the back wall of the chamber and means operatively connected to the gas discharge outlet of the chamber for condensing the liquid oils from the gaseous discharge vapors produced by the pyrolytic decomposition of the tires.

11. The oven according to claim 10 wherein said oven includes means for purging the chamber and the container with an inert gas.

12. The oven according to claim 10 or 11 wherein said container includes a sloped top for guiding the gases produced by the pyrolytic reaction of the tires toward the snout of the container.

13. The oven according to claims 10 or 11 including means for enclosing said insulating material to form a sealed chamber.

14. An apparatus for pyrolyzing tires to recover hydrocarbon oils and gaseous fuels from the tires, said apparatus including an oven having a chamber, an access door to said chamber and a gas discharge opening to said chamber,
    a number of radiant heating members mounted in the top and bottom of said chamber,
    a container having a discharge snout corresponding to the discharge opening in the chamber and being adapted to hold shredded tires,
    said container being placed in said chamber with the discharge snout aligned with the discharge opening in the chamber and means for heating said radiant heating members to a temperature sufficient to pyrolyze the shredded tires in said container whereby the gases produced by the pyrolytic reaction of the tires to the heat in the chamber are discharged through the discharge snout of the container.

15. The apparatus according to claim 14 including condensing means for condensing the oils from the gaseous discharge product of the pyrolyzed tires and a discharge duct assembly connecting said condensing means to said opening in said chamber.

16. The apparatus according to claim 15 including means connected to said condensing means for drawing gases from said container through said condensing means.

17. The apparatus according to claim 14 including means for purging said chamber and said container with inert gas.

18. The apparatus according to claim 14, 15 or 17 including means for hermetically sealing said chamber.

19. An apparatus for converting shredded tires into liquid and gaseous fuels, said apparatus comprising an oven including a chamber having a discharge opening at one end of said chamber, radiant heating means in the top and bottom of said chamber, a tote for holding shredded tires and having a discharge snout, said tote being positioned in said chamber with the discharge snout extending into said discharge opening, condenser means connected to said discharge opening and means connected to said condenser means for producing a negative pressure at said discharge opening whereby gaseous vapors produced by the pyrolytic reaction of the tires will be drawn through said condenser means.

20. The apparatus according to claim 19 including means for hermetically sealing said chamber.

21. The apparatus according to claim 20 wherein said tote includes a top wall which is sloped to guide said vapors toward said snout.

22. The apparatus according to claim 19 or 20 including means for purging said chamber with inert gas.

23. The apparatus according to claim 19 wherein said oven includes high temperature insulating blocks for defining said chamber and a metal cover enclosing said insulating blocks to hermetically seal said chamber.

* * * * *